United States Patent [19]

Oosterling

[11] Patent Number: 5,782,199
[45] Date of Patent: Jul. 21, 1998

[54] DEVICE AND METHOD FOR AUTOMATICALLY MILKING OF ANIMALS

[75] Inventor: Pieter Adriaan Oosterling, Vijfhuizen, Netherlands

[73] Assignee: Prolion B.V., Vijfuizen, Netherlands

[21] Appl. No.: 776,416

[22] PCT Filed: Jul. 27, 1995

[86] PCT No.: PCT/NL95/00261

§ 371 Date: Jan. 28, 1997

§ 102(e) Date: Jan. 28, 1997

[87] PCT Pub. No.: WO96/03031

PCT Pub. Date: Feb. 8, 1996

[30] Foreign Application Priority Data

Jul. 28, 1994 [NL] Netherlands .................... 9401238

[51] Int. Cl.⁶ ...................................... A01J 5/00
[52] U.S. Cl. ........................ 119/14.02; 119/14.03
[58] Field of Search ................ 119/14.01, 14.02, 119/14.03, 14.04, 14.14

[56] References Cited

U.S. PATENT DOCUMENTS 4,000,718 1/1977 Brown .................... 119/14.03
5,069,160 12/1991 Street et al. .............. 119/14.08

FOREIGN PATENT DOCUMENTS

| 0551956 | 7/1993 | European Pat. Off. | A01J 7/00 |
| 3702465 | 8/1988 | Germany | A01J 5/00 |
| 8903163 | 7/1991 | Netherlands | A01K 11/00 |

OTHER PUBLICATIONS

Database WPI, Section PQ, Week 9131, Derwent Publications Ltd., London, GB, Class P14, AN 91-228403.

*Primary Examiner*—Ren Yan
*Assistant Examiner*—Dave A. Ghatt
*Attorney, Agent, or Firm*—Webb Ziesenheim Bruening Logsdon Orkin & Hanson, P.C.

[57] ABSTRACT

A device and method for automatic milking of animals. The device includes one or more milking stalls provided with an entrance gate and an exit gate, a lying and walking area, a feeding and watering area, and an access gate having a first identification system which is coupled to a control system for controlling the device. The access gate can alternatingly clear a passage for an animal from the walking area to a milking stall or to the feeding and watering space. A waiting area is incorporated between the access gate and the entrance gate.

13 Claims, 1 Drawing Sheet

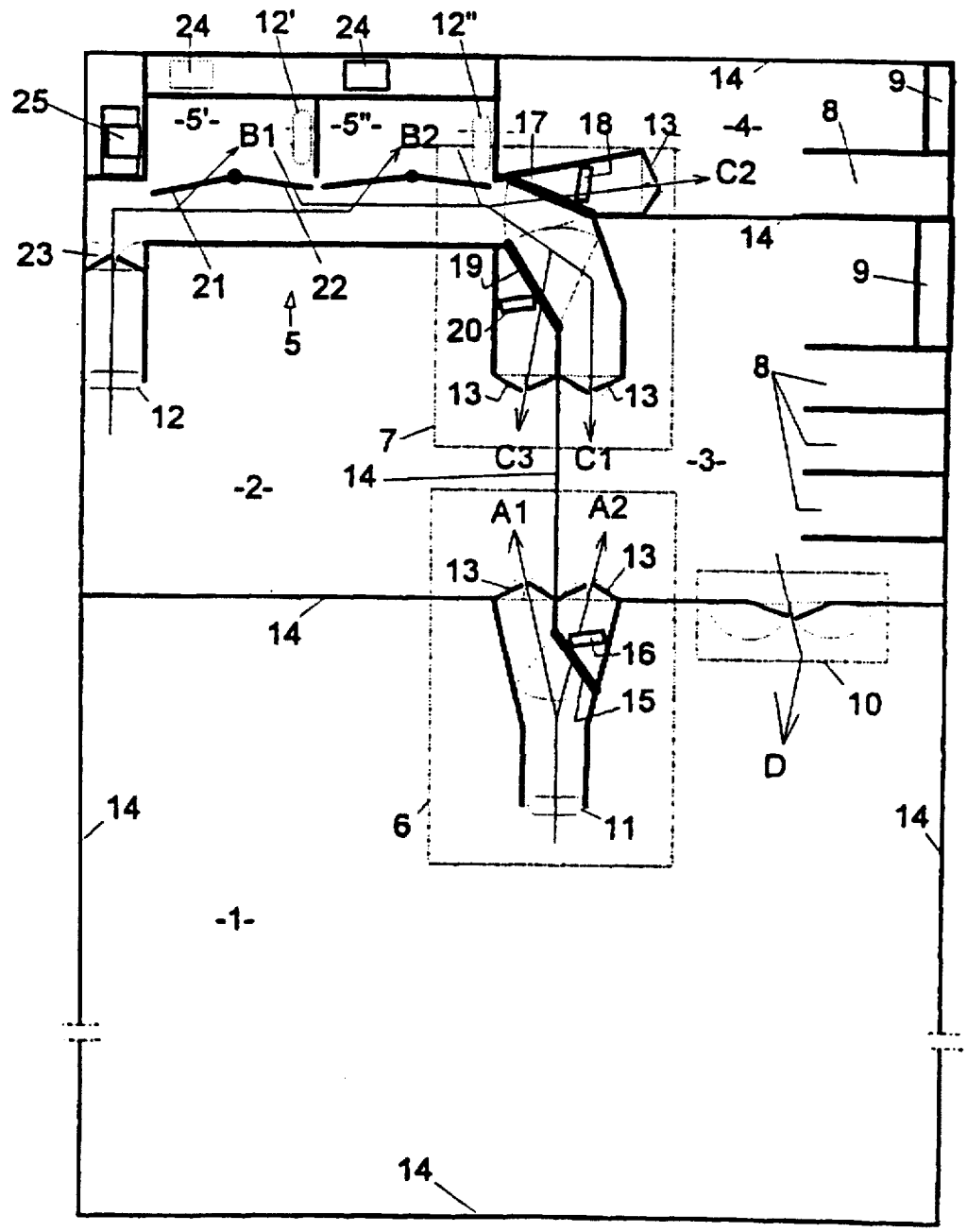

DEVICE AND METHOD FOR AUTOMATICALLY MILKING OF ANIMALS

BACKGROUND OF THE INVENTION

1. Field of the Invention

The invention relates to a device for automatic milking of animals, comprising inter alia one or more milking stalls provided with an entrance gate and an exit gate, a lying and walking area, a feeding and watering area, and an access gate which is provided with a first identification system coupled to a control system for controlling the device, which access gate can alternatingly clear a passage for an animal from the walking area to a milking stall or to the feeding and watering space.

2. Description of the Prior Art

Such devices are known inter alia from DE 3702465 in which a device is described wherein cows on the way from a walking stall to a feeding and drinking location are guided past a milking stall with an automatic milking device. The drawback of the known devices is that the limited capacity of the milking system limits the access to the feeding and drinking location, whereby cows which have left this feeding and drinking location can return to this area only after a long wait. These animals hereby become unsettled and cannot eat and drink sufficiently, whereby the supply of milk is adversely affected.

The object of the invention is to provide a device wherein cows which do not require milking or which cannot yet be admitted to the milking device always have free access to food or drink and wherein the cows for milking do not become disturbed during the wait for access to the milking stall.

SUMMARY OF THE INVENTION

The invention relates to a milking device wherein a waiting area is incorporated between the access gate and the entrance gate.

By arranging a separate waiting area in front of the milking stall the animals waiting for milking can be segregated, whereby the access gate is not blocked by waiting animals and the access to the feeding and watering space is not obstructed by waiting animals. Animals waiting to be milked are not disturbed by animals going to the feeding and watering space.

The invention also relates to a method for automatic milking of animals which under the influence of a control system are guided via an access gate to one of the milking stalls provided with an automatic milking device, wherein the animals are identified as milk-ripe animals by a first identification system placed in the access gate.

Such a method is known from the above stated DE 3702465, wherein it is expected that after the entrance to the milking stall has been opened the animals will walk directly to a milking stall of which the entrance gate has been opened.

A drawback to the known method is that it is always necessary to wait until the identified animal is in the milking stall and the stall is closed before the following animal can be admitted into the other milking stall. This is necessary since otherwise it is not certain which animal is being milked in which stall. It would then not be possible to record the milking data in the control system. This wait-time reduces the capacity of the device.

The invention has for its object to obviate this drawback in that before leaving the milking stall the animals are identified by a second identification system and the milking data recorded in the control system.

It is hereby possible for more than one animal to be present between the access gate and the milking stall, while the correct milking data associated with an animal is nevertheless always recorded in the control system.

The invention is elucidated hereinbelow on the basis of a description of an embodiment of a milking installation with which a herd of cows is milked automatically and with reference to a figure.

BRIEF DESCRIPTION OF THE DRAWING

The drawing figure is a schematic plan view of the milking device of the invention.

DESCRIPTION OF PREFERRED EMBODIMENT

Shown in the figure is a schematic overview of the diverse areas in which a herd of free-ranging cows provided with identification means is accommodated during the day. The herd, which may consist of several dozen to more than 100 cows, normally occupies a lying and walking area 1 which communicates by means of an access gate 6 provided with an identification system 11 with a waiting area 2 and a feeding and watering space 3. A swivel gate 15 operated with an air cylinder 16 is incorporated in the access gate.

The waiting area 2 joins onto a milking parlour 5 which is connected via an exit fence 7 to a segregation area 4, the feeding and watering space 3 and the waiting area 2. The size of waiting area 2 depends on the capacity of milking parlour 5 and the number of animals in the herd. It is conceivable that the waiting area 2 takes such a large form that the wait-time for the cows in waiting area 2 can amount to a maximum of one hour.

Incorporated in the exit fence 7 is a swing gate 17 operated by an air cylinder 18 in addition to a swing gate 19 operated by an air cylinder 20.

The swing gates 15, 17 and 19 can of course also be operated in different manner, and there are for instance electrically controlled actuators instead of air cylinders 16,18 and 20.

The feeding and watering space 3 is connected via an exit fence 10 to the lying and walking area 1. The diverse spaces are separated from each other and from the surrounding area by a fence 14. Openings (not shown) can be made by hand in this fence by the operator, as is necessary for instance when the operator leads cows out of the segregation area 4 to other areas, such as for instance the milking parlour 5. In the lying and walking area 1, the segregation area 4 and the feeding and watering space 3 can be placed cubicles (not shown) in which the cows can rest.

Both the access gate 6 and the exit fence 7 are provided at each exit with a one-directional gate 13 so that cows cannot walk back. Such one-directional gates can for instance fall back into the closed position due to the force of gravity, although it is also possible for them to be carried into the closed position with a spring on each swinging part. The dimensions of the passageways are also such that the animals cannot turn round in the various passageways.

Arranged in milking parlour 5 is a milking stall 5' and a milking stall 5" which are both provided with a milking installation (not shown) including teat cups which are arranged round the teats of the cow for milking. Each milking stall 5' or 5" is provided with an entrance gate 21 and an exit gate 22. A placing robot 24 can couple the teat cups to the teats of the cow in both milking parlours 5' and 5". Access to milking stalls 5' and 5" from the waiting area 2 proceeds via the identification system 12 and the entrance gate 23.

In another embodiment an identification system 12' or 12" is arranged in each milking stall 5' or 5" instead of the identification system 12 at the entrance to the milking parlour 5.

A feeding stall 8 and a drinking trough 9 are placed in both the segregation area 4 and in the feeding and watering area 3. The feeding stall 8 is suitable for providing feed concentrate to the cows and is provided for this purpose with an identification system so that each individual cow receives the dosage to which it is entitled. Optionally there are also feeding stalls where bulk fodder is supplied to the cows.

From the feeding and watering area 3 the cow can return to the lying and walking area 1 via an exit gate 10. This exit gate 10 is embodied such that the exit gate 10 is always open in the direction toward the lying and walking area 1. Exit gate 10 can however also be adjusted to open in both directions.

The device is controlled by a control system 25 which is coupled to the diverse identification systems, the diverse gates, the placing robot 24 and the milking installation. The operation of the device is as follows:

From the moment that milking time begins the exit gate 10 is adjusted, for instance by control means present in the gate and controlled by control system 25, such that the cows can only walk in a direction D through exit gate 10.

Any cow which wishes to eat or drink will now be able to pass only via the access gate 6 to the feeding and watering area 3. The cow is identified in access gate 6 by the identification system 11 and guided in a direction A1 if it must be milked. Cows which have already been milked or which are dry are guided in a direction A2 and thus have direct access to the drinking trough 9 or the feeding stall 8.

Cows in the waiting area 2 will proceed toward the milking parlour 5, pass through the identification system 12 and wait in front of the entrance gate 23. Identification may optionally take place in milking stall 5' or 5". If milking stall 5' (optionally 5") is available, exit gate 22 then closes and entrance gate 21 and entrance gate 23 open. The cow now walks in a direction B1 (optionally B2), gate 21 closes and the placing robot 24 places the teat cups round the teats and milking begins.

During the stay in milking stall 5' (or 5"), three situations may occur: In the most frequently occurring situation the cow is milked normally and will leave milking stall 5' in a direction C1 after opening of exit gate 22. Should it be established during milking that the cow requires particular attention, for example if a mastitis infection is detected or in the case the operator has entered into the control beforehand that the cow must be segregated, the cow will then leave milking stall 5' in a direction C2. Should it be found that connection of the teat cups round the teats has not been successful, for instance if connection has not succeeded after 3 to 5 attempts or after a period of 3 minutes, the cow is then guided in a direction C3, whereafter it can re-enter milking parlour 5 after a time.

It is possible that the waiting area 2 is so full of cows that there is only room for animals which come out of milking parlour 5 via direction C3. An additional entrance gate can then be placed in access gate 6, whereby milk-ripe animals are not admitted into waiting area 2 and remain in the lying and walking area 1. An alternative in this situation is to guide all animals arriving at the access gate 6 in the direction A2 to the feeding and watering area 3 and by means of the control 25 to prevent the animals being supplied with feed in feeding stall 8. After a time they will then return to access gate 6 and can then be admitted into waiting area 2.

It has been found in practice that it is important to stimulate the animals and to urge them for instance with coercive means out of walking area 1 to milking parlour 5. These coercive means (not shown) may consist for instance of movable fences on which inter alia electrical stimulating means are arranged.

I claim:

1. A device for automatic milking of animals, the device comprising:

at least one milking stall having an entrance gate and an exit gate;

a lying and walking area;

a feeding and watering area;

an access rate having a first identification system, which access gate is configured to clear a passage for an animal from the walking area to at least one of the at least one milking stall and the feeding and watering area;

a control system for controlling the at least one milking stall and the rates, wherein the first identification system is coupled to the control system; and a waiting area located between the access gate and the entrance gate, the waiting area dimensioned to permit the movement of a plurality of animals that are waiting longer than a milking time of more than one animal.

2. The device for automatic milking of animals as claimed in claim 1, including a second identification system coupled to the control system for recording milking data and placed between the waiting area and the exit gate.

3. The device for automatic milking of animals as claimed in claim 2, including a separating device connecting an exit of the at least one milking stall to the waiting area.

4. The device for automatic milking of animals as claimed in claim 1, including a separating device connecting an exit of the at least one milking stall to the waiting area.

5. A method for automatic milking of animals, including the steps of:

guiding the animals by a control system via an access gate and a waiting area to at least one milking stall having an automatic milking device;

identifying milk-ripe animals by a first identification system located in the access gate;

allowing the guided animals to roam with other guided animals in the waiting area before entering the at least one milking stall in an arbitrary sequence;

identifying the animals before leaving the at least one milking stall by a second identification system;

and recording milking data in the control system.

6. A method for automatic milking of animals, including the steps of:

guiding the animals by a control system via an access gate and a waiting area to at least one milking stall having an automatic milking device;

identifying milk-ripe animals by a first identification system located in the access rate;

identifying the animals before leaving the at least one milking stall by a second identification system;

recording milking data in the control system; and guiding an animal admitted for the first time into the milking stall back to the waiting area when connection of an automatic milking device to the animal has failed.

7. The method for automatic milking of animals as claimed in claim 6, including guiding an animal admitted a plurality of times into the milking stall, to a segregation area when connection of an automatic milking device does not result in a predetermined supply of milk.

8. The method for automatic milking of animals as claimed in claim 7, including guiding animals after successful milking through the access gate to the feeding and watering area when a preset number of animals occupying the waiting area would be exceeded.

9. The method for automatic milking of animals as claimed in claim 7, including guiding the animals to a feeding and watering area having at least one feeding stall supplying the at least one feeding stall with feed only after the animals have visited the at least one milking stall.

10. The method for automatic milking of animals as claimed in claim 6, including guiding animals after successful milking through the access gate to the feeding and watering area when a preset number of animals occupying the waiting area would be exceeded.

11. The method for automatic milking of animals as claimed in claim 10, including guiding the animals to a feeding and watering area having at least one feeding stall supplying the at least one feeding stall with feed only after the animals have visited the at least one milking stall.

12. The method for automatic milking of animals as claimed in claim 6, including guiding the animals to a feeding and watering area having at least one feeding stall supplying the at least one feeding stall with feed only after the animals have visited the at least one milking stall.

13. A method for automatic milking of animals, including the steps of:

guiding the animals by a control system via an access gate to at least one milking stall having an automatic milking device;

identifying milk-ripe animals by a first identification system located in the access gate;

identifying the animals before leaving the at least one milking stall by a second identification system;

recording milking data in the control system;

guiding the animals to a feeding and watering area having at least one feeding stall; and supplying the at least one feeding stall with feed only after the animals have visited the at least one milking stall.

\* \* \* \* \*

UNITED STATES PATENT AND TRADEMARK OFFICE
CERTIFICATE OF CORRECTION

PATENT NO. : 5,782,199
DATED : July 21, 1998
INVENTOR(S) : Pieter Adriaan Oosterling It is certified that error appears in the above-identified patent and that said Letters Patent is hereby corrected as shown below:

Column 2 Line 16 before "PREFERRED" insert --THE--.

Column 3 Line 33 "direction A1" should read --direction A1--.

Claim 1 Column 4 Line 17 "access rate" should read --access gate--.

Claim 1 Column 4 Line 24 "rates" should read --gates--.

Claim 6 Column 4 Line 61 "access rate" should read --access gate--.

Claim 7 Column 5 Line 3 after "milking stall" delete comma --,--.

Signed and Sealed this

First Day of December, 1998

Attest:

BRUCE LEHMAN

Attesting Officer

Commissioner of Patents and Trademarks